United States Patent [19]

Takahashi et al.

[11] Patent Number: 4,791,512
[45] Date of Patent: Dec. 13, 1988

[54] INDEX SIGNAL DETECTING SYSTEM

[75] Inventors: Takao Takahashi; Hiroshi Okada, both of Tokyo, Japan

[73] Assignee: Sony Corporation, Tokyo, Japan

[21] Appl. No.: 889,833

[22] Filed: Jul. 28, 1986

[30] Foreign Application Priority Data

Jul. 26, 1985 [JP] Japan .................................. 60-166323

[51] Int. Cl.$^4$ ............................................. H04N 5/783
[52] U.S. Cl. .................................. 360/10.2; 360/10.3; 360/70; 360/73.06
[58] Field of Search ...................... 360/10.2, 10.3, 70, 360/77, 32, 73, 72; 369/47

[56] References Cited

U.S. PATENT DOCUMENTS

| | | | |
|---|---|---|---|
| 3,663,763 | 5/1972 | Trost | 360/70 |
| 3,921,132 | 11/1975 | Baldwin | 360/33.1 |
| 4,420,778 | 12/1983 | Sakamoto | 360/10.2 |
| 4,447,835 | 5/1984 | Smith | 360/10.2 |
| 4,542,419 | 9/1985 | Moria | 360/19.1 |
| 4,583,132 | 4/1986 | Nakano | 360/19.1 |

Primary Examiner—Alan Faber

[57] ABSTRACT

An index signal detecting system for detecting an index signal recorded in a predetermined track area in a high speed playback mode. According to this index signal detecting system, the rotary head is wobbled in a direction intersecting the track so that in the high speed playback mode, the index signal can always be picked up by the rotary head.

6 Claims, 7 Drawing Sheets

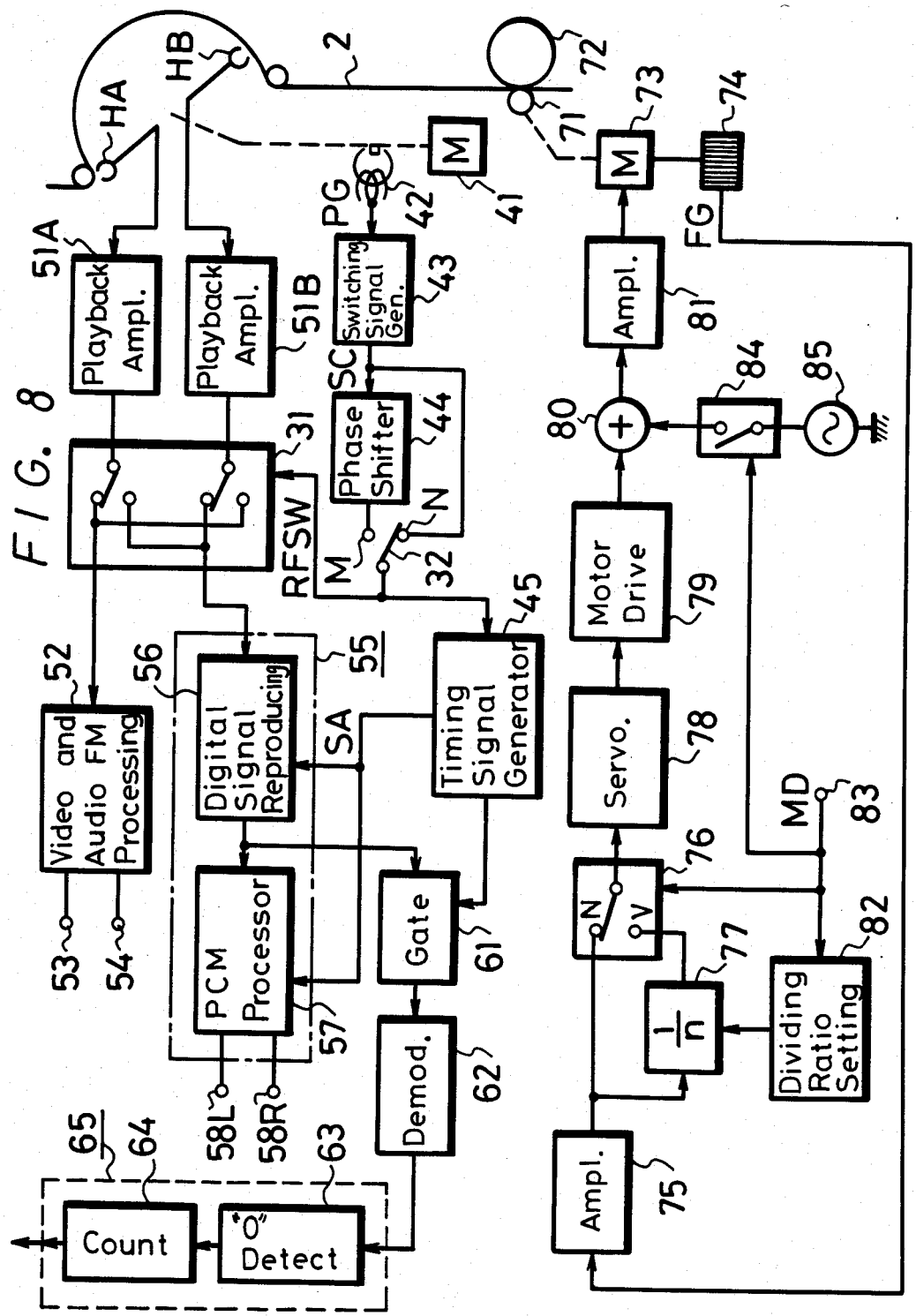

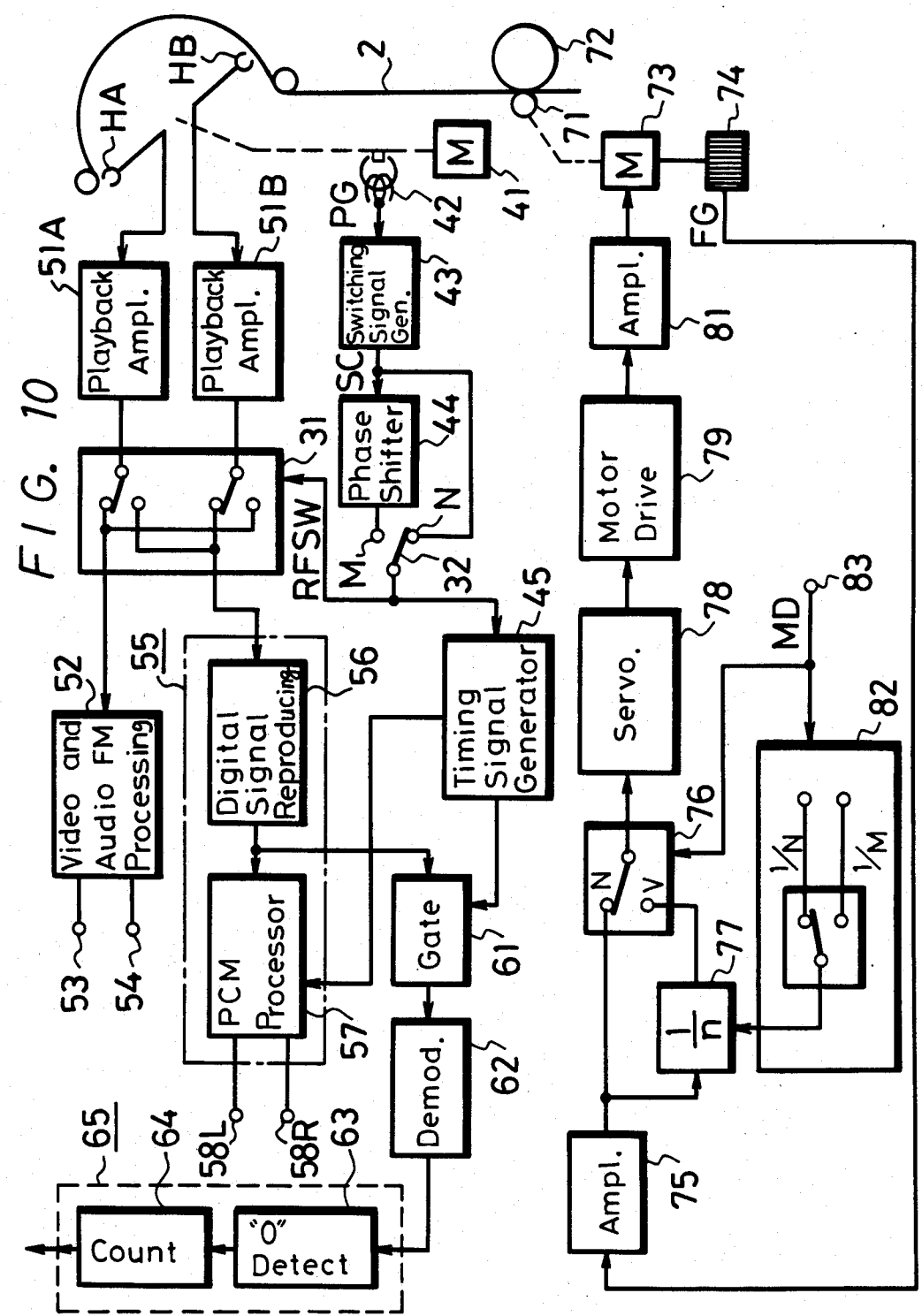

INDEX SIGNAL DETECTING SYSTEM

BACKGROUND OF THE INVENTION

This invention relates generally to an index signal detecting system for detecting an index signal recorded in a track area separate from those track areas of a video signal and PCM (pulse code modulated) audio data so as to carry out a program search for use with a rotary head type recording and/or reproducing apparatus, such as an 8 mm video tape recorder (VTR) or the like.

The so-called 8 mm VTR (video tape recorder) can employ a recording mode for recording an audio signal which is frequency-modulated and mixed with a color video signal under the condition that the audio signal is separable from the color video signal in frequency. Also, the 8 mm VTR can employ an optional recording mode in which the audio signal is pulse-code-modulated and recorded in an area separate from that of the color video signal so as to form a single skewed track.

FIG. 1 schematically illustrates one example of a rotary head assembly used in the 8 mm VTR and FIG. 2 illustrates a tape format thereof.

Referring to FIG. 1, record and reproduce rotary magnetic heads HA and HB are arranged to differ from each other with respect to their recording gap angles, and are mounted on a rotary drum 1 with a rotational angle distance of 180° therebetween. The rotary magnetic heads HA and HB are rotated at a frame frequency (30 Hz) in the direction by an arrow 3H under the state that they are slightly protruded from the periphery of the rotary drum 1. A magnetic tape 2 is wrapped around the periphery of the rotary drum 1 over an angular range of 221° in a helical fashion and is transported at a constant speed during recording and normal playback in the direction shown by an arrow 3T.

Accordingly, as shown in FIG. 2, a signal is recorded in such a manner that tracks 4A and 4B having corresponding lengths of 221° in rotary head rotation angle are alternately formed on the tape 2 by the rotary heads HA and HB. On an area AP of about 36° in rotary head rotation angle (including a margin to record a PCM audio signal in the so-called after-recording mode and a guard band area) from a time point at which the rotary heads HA and HB start to scan the tracks 4A and 4B, there is recorded a pulse-code-modulated and time-base-compressed audio signal associated with one field period of the video signal. On a succeeding area AV of 180° of rotary head rotation angle, there are recorded a color video signal, an FM (frequency-modulated) one field period audio signal, and a tracking pilot signal. The remaining area of 5° in rotary head rotation angle is assigned as a head detaching area used when the rotary head HA or HB detaches from the tape 2.

As described above, the 8 mm VTR is capable of recording and/or reproducing the PCM audio signal. Thus, this feature of the 8 mm VTR attracts particular attention and such a technology has previously been proposed to use the color video signal recording area AV as the PCM audio signal recording area so that the 8 mm VTR can be used also as an exclusive apparatus for recording and/or reproducing a PCM audio signal (see U.S. Pat. No. 4,542,419, issued on Sept. 17, 1985, incorporated herein by reference).

The above-mentioned previously proposed technology effectively utilizes the fact that the area AV of 180° in rotary head rotation angle, where the video signal and so on are recorded, is five times as long as the PCM area AP of 36° in rotary head rotation angle. Then, the area AV is equally divided by 5 to form 5 divided segment track areas AP2 to AP6 shown by ② to ⑥, in addition to the original PCM audio signal track area AP1 shown by ① for each of the tracks 4A and 4B, as shown in FIG. 3. Then, the PCM audio signal of one channel, that is, the PCM audio signal of one field period with the compressed time base, is recorded in and-/or reproduced from each of 6 segment track areas AP1 to AP6.

Accordingly, in this case the audio signal of one channel can be recorded and/or reproduced by the area unit so that the 6 channel audio signal can be recorded and/or reproduced, thus providing a recording time (capacity) 6 times as long as the prior art recording time (hereinafter this technique will be referred to as a multi-PCM mode).

In the multi-PCM mode, a PCM signal processor may be a signal processor capable of processing a signal of one channel, and which is used in the prior art 8 mm VTR because the PCM signal is recorded and/or reproduced at the unit of every segment track area.

By the way, the track format of the above mentioned 8 mm VTR will be described more fully with reference to FIG. 4. Referring to FIG. 4, from the right-hand side at which the rotary head begins to scan the magnetic tape 2, a top portion area of 5° in rotary head rotation angle is assigned as a tracing start area 11. An area of the latter half of this tracing start area 11 and having 2.06° (corresponding to 3H periods where H is the horizontal period) in a rotation angle of a rotary head is assigned as a preamble area 12 which becomes a clock run-in area synchronized with a PCM data succeeding thereto. Next to the preamble area 12, there is provided a PCM data recording area 13 of 26.32° in rotary head rotation angle in which a time-base-compressed PCM audio signal is recorded. An area next to the PCM data recording area 13 and having 2.06° (3H) in rotary head rotation angle is assigned as a postamble area 14 which is used as a margin to cope with a case where the recording position is displaced in the after-recording mode and so on. A next area having 2.62° in rotary head rotation angle is assigned as a guard band area 15 between a video signal area and the PCM data area 13. Next to the guard band area 15, there is provided a one field video signal recording area 16 over 180° of a rotary head rotation angle. Then, an area next to the video signal recording area 16 is assigned as a head detaching area 17 of 5° in rotary head rotation angle.

FIG. 5 illustrates in greater detail a track format of the multi-PCM mode. A one segment track area for the PCM audio signal is exactly the same as the PCM audio area in the track format of the 8 mm VTR. Referring to FIG. 5, this track format of the multi-PCM system is formed of a tracing start area 21, a preamble area 22, a PCM data area 23, a postamble area 24, and a guard band area 25. This track format is assigned to each of the segment track areas AP1 to AP6.

The PCM data is recorded such that the data "1" and "0" are modulated and then recorded on the tape 2. In the 8 mm VTR, for example, the data "1" is frequency-modulated as a signal having a frequency of 5.8 MHz and then recorded, while the data "0" is frequency-modulated as a signal having a frequency of 2.9 MHz and then recorded. In the preamble area 12 or 22 and the postamble area 14 or 24, there is recorded all "1" data, that is, the signal having a frequency of 5.8 MHz.

As a method for carrying out the program search in the 8 mm video tape recorder mode and the multi-PCM mode, the assignee of the present application has previously proposed a technique in which an index signal is recorded, for example, in the postamble area 14 or 24 in the respective track formats as described above, and this index signal is used as the program search (see U.S. patent application, Ser. No. 838,626, filed on Mar. 11, 1986).

According to the previously proposed invention, the index signal can be recorded and/or reproduced by the rotary head so that it is unnecessary to provide an exclusive stationary head for the index signal. Furthermore, the index signal can easily be recorded and/or erased in the after-recording mode.

The above mentioned program search using the recorded index signal is frequently carried out in the so-called high speed playback mode in which the tape is transported at high speed. In this case, the rotary head HA and HB scan a plurality of recording tracks as shown in FIG. 6.

Since the rotary heads HA and HB differ from each other in the azimuth angle of the recording gap, in the high speed playback mode the respective rotary heads HA and HB pick up the signal only after either one of the tracks 4A and 4B. Therefore, reproduced outputs of both the heads HA and HB become as shown in FIGS. 7A and 7B. In FIGS. 7A to 7D, reference letter TA designates a scanning locus of the rotary head HA, and reference letter TB designates a scanning locus of the rotary head HB, respectively. The envelope waveforms of the outputs from the rotary heads HA and HB in the respective scanning loci TA and TB are illustrated in FIGS. 7A to 7D.

In the high speed playback mode, although the drum phase servo can be applied to the rotary heads HA and HB, the tracking servo is not applied to the recording track so that the scanning position of the rotary head relative to the recording track pattern is not determined. However, after the high speed playback is started and the tape is started running, the scanning phase of the rotary head relative to the recording track pattern is determined so that the envelope waveform is repeated at the period corresponding to the scanning phase.

FIG. 7A shows an example of an envelope waveform of the output from the rotary head at a certain scanning phase when the tape speed is an even multiple of the normal tape speed. FIG. 7B shows an example of an envelope waveform of the output from the rotary head at a certain scanning phase when the tape speed is an odd multiple of the normal tape speed, respectively. When the tape speed is exactly the integer multiple of the normal tape speed, as shown in FIGS. 7A and 7B, the envelope waveforms of the reproduced outputs from the respective rotary heads HA and HB become fixed.

On the other hand, if the tape speed is not the integer multiple of the normal tape speed but is added with an offset value $\alpha$ to thereby make the tape speed the integer multiple $\pm \alpha$ ($0 < \alpha < 1$), the envelope waveform is repeated at a predetermined period. For example, if $\alpha = \pm \frac{1}{2}$, the envelope waveform becomes an envelope waveform which is repeated at every 2 rotations (4 scannings) of the rotary drum 1 as shown in FIG. 7C. Whereas, if $\alpha = \pm \frac{1}{4}$, the envelope waveform becomes envelope waveforms which are repeated at every 4 rotations (8 scannings) of the rotary drum 1 as shown in FIG. 7D.

When the envelope waveforms of both the rotary heads HA and HB become the same, such as shown in FIG. 7B in which the tape speed is the odd multiple of the normal tape speed, if the position at which the rotary head scans the index area is displaced to the position at which the rotary head scans the track having a different azimuth angle from that of the rotary head, the envelope output becomes substantially zero as shown by the hatched area representing the index signal in FIG. 7B. Thus, the index signal cannot be reproduced at all. Furthermore, when the tape speed is the even multiple of the normal tape speed (in FIG. 7A), if the hatched area in FIG. 7A is taken as the index area, the index signal cannot be picked up at all from the reproduced output of the rotary head HB.

This defect can be avoided if the tape speed is added with the particular offset value $\alpha$ as shown in FIGS. 7C and 7D. As shown by the hatched areas in FIGS. 7C and 7D, although the reproduced output becomes zero in the index area portion by a certain single scanning, a reproduced output which is more than a predetermined level can be obtained in this index area portion by other scanning.

However, in order to afford the offset value $\alpha$, it becomes necessary to move the tape by the capstan in the high speed playback mode. Also, the higher the tape speed becomes due to a tape slip or the like, the more difficult becomes the tape speed control.

With a tape speed which is an integer multiple of the normal tape speed, there is another method for preventing the output reproduced from the index area by the rotary head from becoming zero. That is, the scanning phase may be controlled such that the output from the index area does not become zero. In that case, when the reel motor is servo-controlled or the tape is transported by the capstan, the capstan motor must be servo-controlled. Furthermore, it is very difficult to apply this method to the multi-PCM mode.

SUMMARY OF THE INVENTION

It is an object of this invention to provide an improved index signal detecting system which can remove the defects encountered in the prior art.

It is another object of this invention to provide an improved index signal detecting system in which an index signal can always be reproduced by a rotary head in the high speed playback mode in a positive fashion.

It is a further object of this invention to provide an improved index signal detecting system suitable for use with a helical scan type tape recording apparatus.

According to one aspect of the present invention, there is provided an index signal detecting system applied to a helical scan type tape recording apparatus comprising:
(a) rotary transducing means;
(b) tape driving means for advancing a recording tape in transducing relation to said rotary transducing means;
(c) wobbling means for wobbling relative positions of said rotary transducing means and recorded tracks formed on said recording tape so as to cross said recording tracks by said rotary transducing means; and
(d) an index detecting circuit connected to said rotary transducing means for deriving index information out of reproduced signals obtained from said rotary transducing means.

BRIEF DESCRIPTION OF THE DRAWINGS

FIG. 8 is a block diagram showing one example of a recording and/or reproducing apparatus to which this invention is applied;

FIG. 10 is a block diagram showing another example of the recording and/or reproducing apparatus to which the present invention is applied.

DESCRIPTION OF THE PREFERRED EMBODIMENTS

Figure 1:
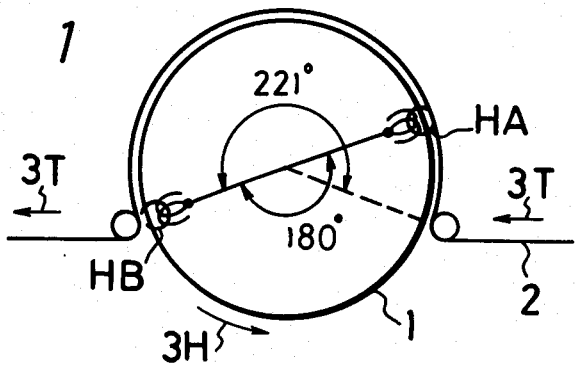
FIG. 1 is a diagram showing one example of a rotary head assembly of the so-called 8 mm video tape recorder to which the present invention is applied.
Figure 2:
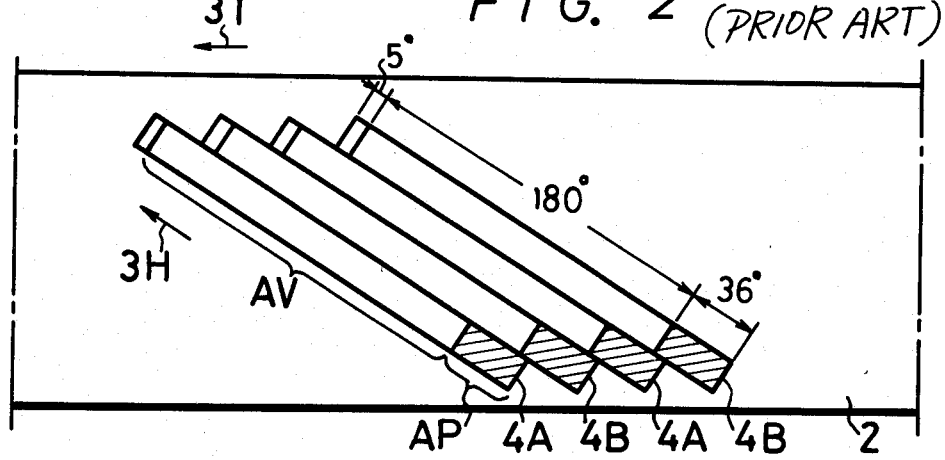
FIGS. 2 and 3 are diagrams respectively showing recording track patterns thereof.
Figure 3:
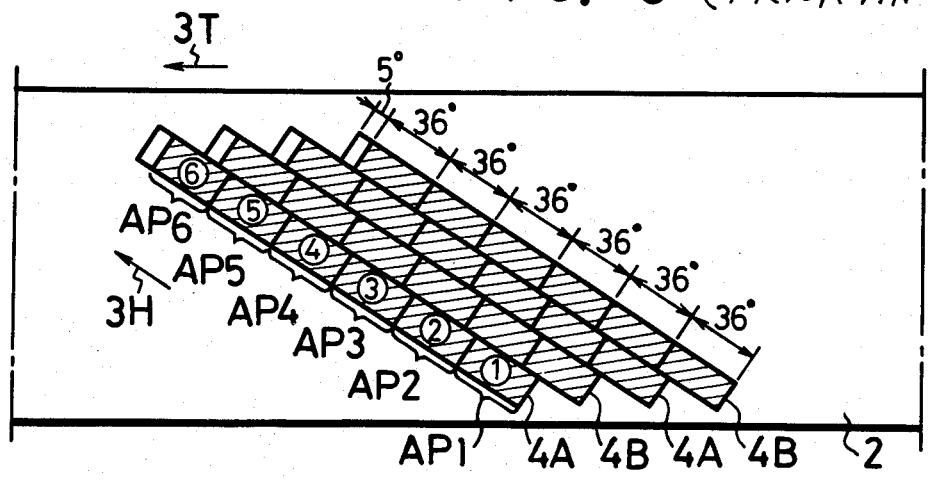
Figure 4:
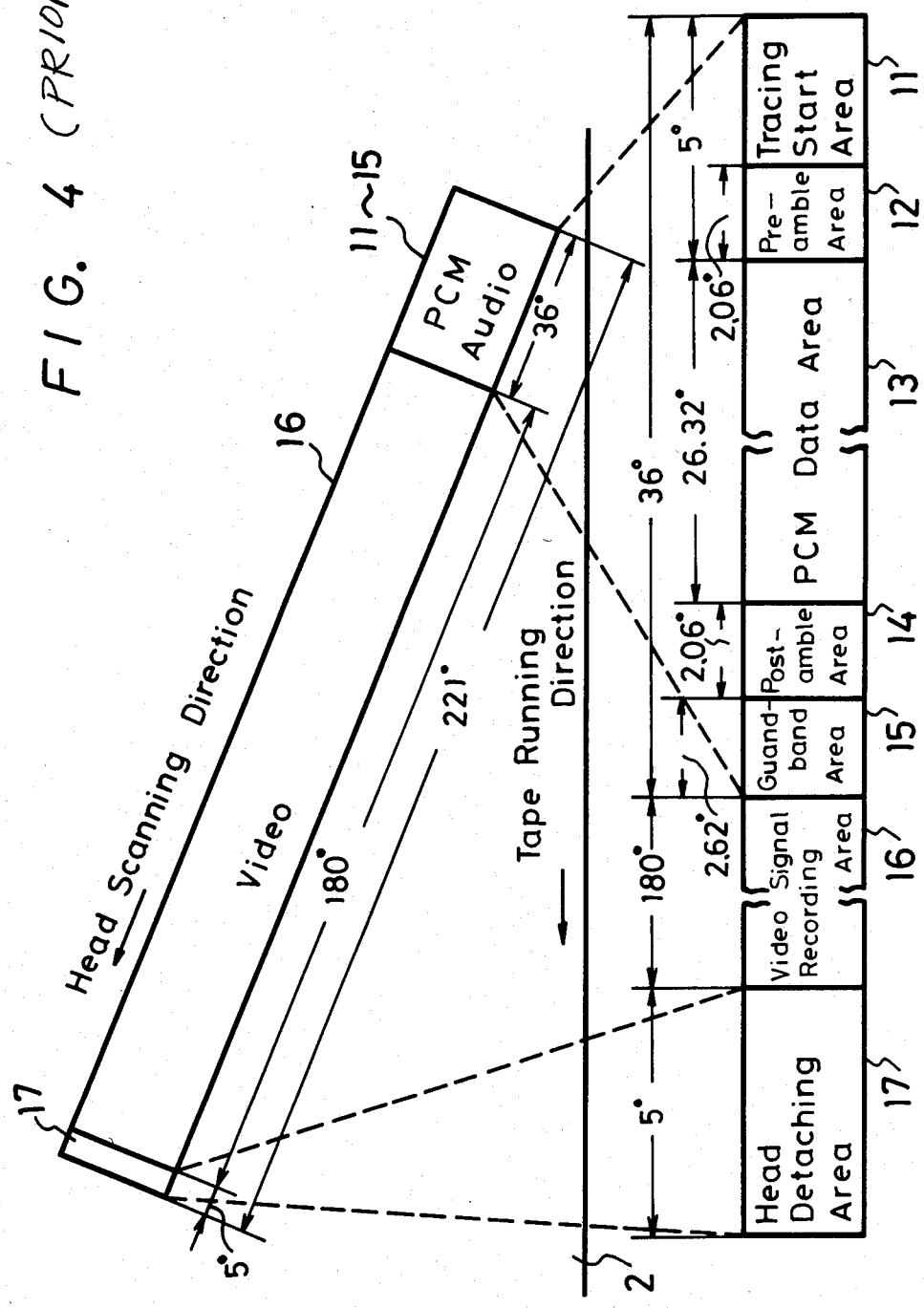
FIGS. 4 and 5 are diagrams respectively used to explain practical track formats thereof.
Figure 5:
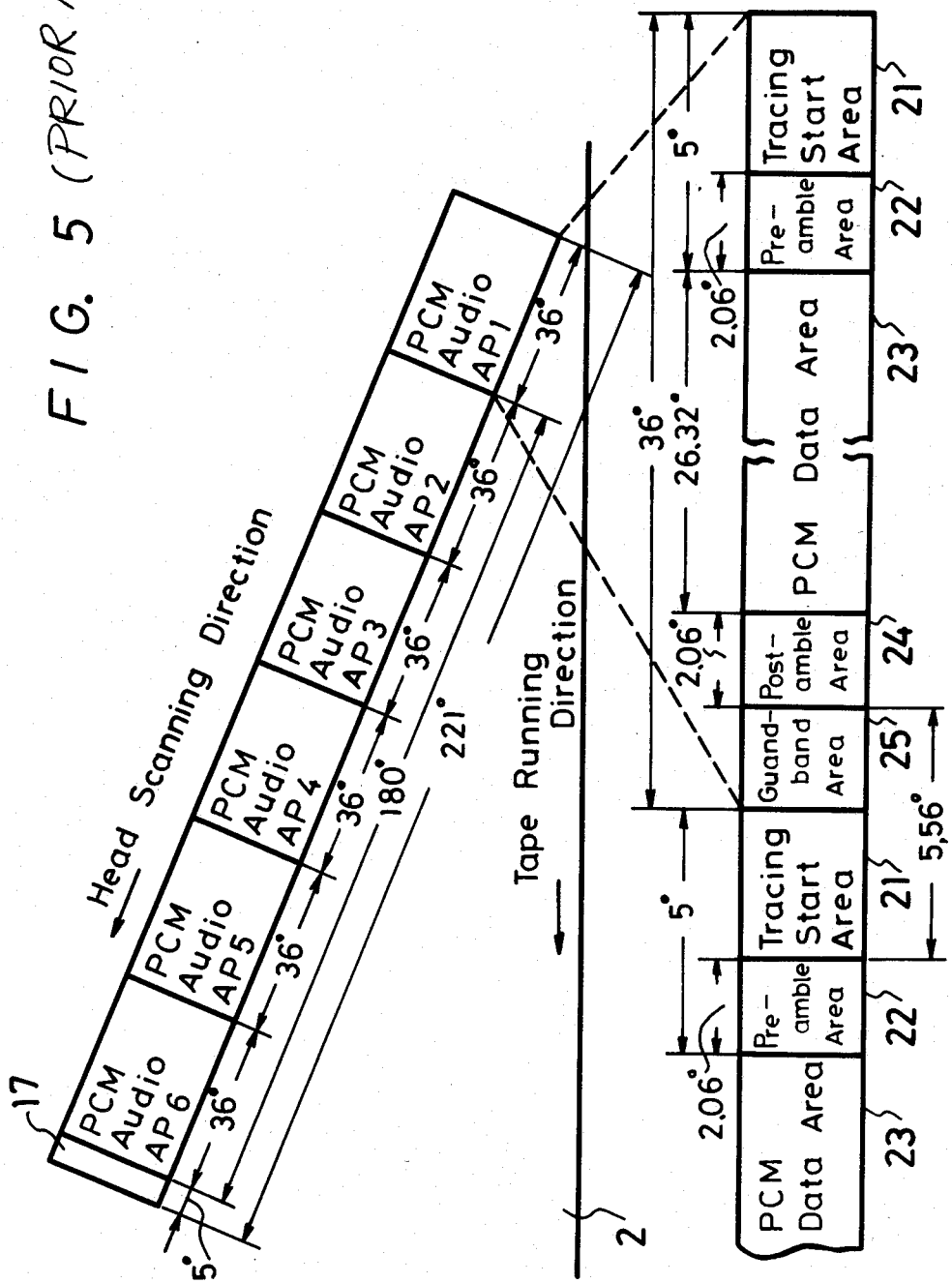
Figure 6:
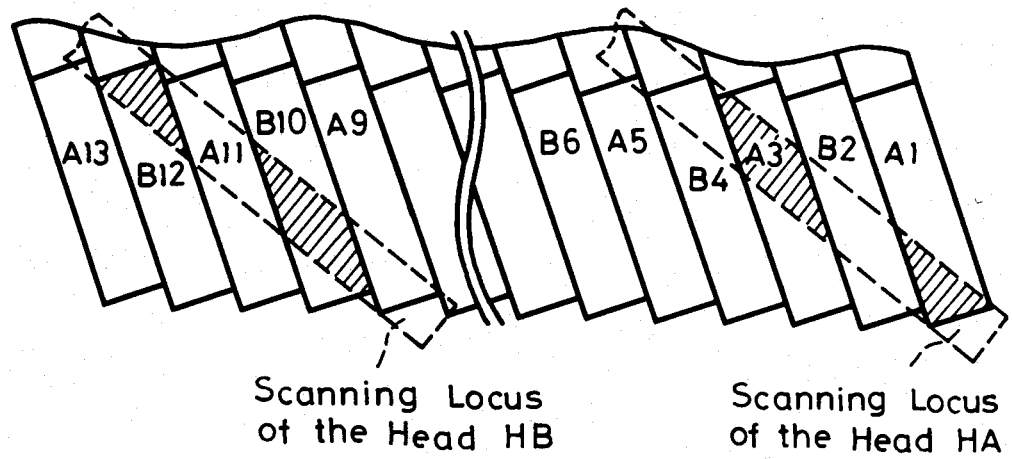
FIG. 6 is a diagram used to explain a tracing locus of a rotary magnetic head in the high speed playback mode.

Now, the present invention will hereinafter be described with reference to the drawings.

FIG. 8 is a block diagram showing one example of an apparatus for recording and/or reproducing a signal to which this invention is applied. In this embodiment, the recording and/or reproducing apparatus is the above mentioned 8 mm video tape recorder.

Referring to FIG. 8, a head change-over switching circuit 31 is adapted to alternately connect its movable contact to the illustrated position and to the position opposite to the illustrated position at every half rotation of the rotary drum in response to a switching signal RFSW.

A switch 32 is adapted to change the switching signal RFSW in the 8 mm video tape recorder mode and the multi-PCM mode. That is, the switch 32 is connected to a fixed contact N in the 8 mm video tape recorder mode.

A pulse generator 42 is provided to produce one pulse at every one revolution of a drum motor 41 for driving the rotary heads HA and HB. A pulse PG having a frequency of 30 Hz indicative of the absolute rotary phases of the rotary heads HA and HB generated from this pulse generator 42 is supplied to a rotary head switching signal generating circuit 43 from which a square wave signal SC having a duty ratio of 50% is derived. In the 8 mm VTR mode, this square wave signal SC is supplied through the switch 32 to the switching circuit 31 as the switching signal RFSW and also to a timing signal generating circuit 45.

In the multi-PCM mode, this switch 34 is changed to be connected to a fixed contact M. At that time, the square wave signal SC from the switching signal generating circuit 43 is supplied to a phase shifting circuit 44 and thereby phase-shifted by 36°×(n−1) where n is an integer corresponding to the segment track number. Thus, n=1 for the segment track area AP1, n=2 for the segment track area AP2, ... n=6 for the segment track area AP6. The signal is phase-shifted and supplied through the switch 32 to the switching circuit 31 as the switching signal RFSW. The switching signal RFSW is further supplied to the timing signal generating circuit 45 which generates a PCM area signal SA indicative of the segment track area specified. This PCM area signal SA is supplied to a PCM audio signal reproducing and processing circuit 55.

The playback mode will be described next. In this playback mode, the drum phase servo is effected with the pulse signal PG taken as a reference, though not shown.

In the normal playback mode, the reproduced signals derived from the rotary heads HA and HB are supplied through playback amplifiers 51A and 51B to the switching circuit 31. When the switching circuit 31 is changed in position by the switching signal RFSW, the video signal and the FM audio signal from the area AV are both supplied to a video and FM audio signal reproducing and processing circuit 52, while the PCM data from the area AP is supplied to the PCM audio signal reproducing and processing circuit 55.

In the video signal and FM audio signal reproducing and processing circuit 52, the video signal is demodulated and then delivered to an output terminal 53, while the FM audio signal is also demodulated and the demodulated output is delivered to an output terminal 54.

On the other hand, in the PCM audio signal reproducing and processing circuit 55, the reproduced signal is waveform-shaped to digital data of "1" and "0" by a digital signal reproducing circuit 56. Thereafter, the digital data is supplied to a PCM processor 57 in which the digital data undergoes the demodulation, error-detection, error-correction and so on. Then, it is reconverted to left channel and right channel analog audio signals and then delivered to output terminals 58L and 58R, respectively.

Furthermore, in the multi-PCM playback mode, the switching signal RFSW is phase-shifted by the shifting amount corresponding to the specified segment track area. The signal picked up from the specified segment track by the rotary heads HA and HB is supplied to the PCM audio signal reproducing and processing circuit 55 which reproduces the audio signal similarly as described above. At that time, the outputs from the video and Fm audio signal reproducing system 52 are muted, though not shown.

A description will be given for a cause in which the index signal is detected in the high speed playback mode. Also at that time, the drum phase servo is applied to the rotary heads HA and HB. Accordingly, in exactly similar manner to the normal playback mode and the multi-PCM playback mode, the switching signal RFSW is generated, the PCM area signal SA is generated from the timing signal generating circuit 45 and the signal reproduced from the PCM area is supplied through the switching circuit 31 to the PCM audio signal reproducing and processing circuit 55.

At that time, the signal from the digital signal reproducing circuit 56 is supplied to a gate circuit 61 and the gate circuit 61 is supplied from the timing signal generating circuit 45 with a gating signal which opens the gate circuit 61 during an interval in which the rotary heads HA and HB scan the index area portion. Thus, from the gate circuit 61 there is derived the output which is reproduced from the index area portion by the rotary heads HA and HB. The output from this gate circuit 61 is supplied to a demodulating circuit 62 in which it is demodulated to the data "1" or "0". The demodulated data from the demodulating circuit 62 is supplied to an index signal detecting circuit 65 which is formed of a "0" detection circuit 63 and a counter 64. When the fact that the data "0" has continued for more than a predetermined time is detected, the detecting circuit 65 generates a detected output indicating the presence of the index signal.

In FIG. 8, reference numeral 71 designates a capstan. The tape 2 is pinched by the capstan 71 and a pinch roller 72, and the tape 2 is thus transported.

A capstan drive motor 73 is adapted to switch the tape speed between the normal playback mode and the high speed playback mode in the following manner.

Specifically, a change-over switch 76 for that purpose is provided whose movable contact is connected to a fixed contact or terminal N in the normal playback mode and to a fixed contact or terminal V in the high speed playback mode, respectively.

Furthermore, the capstan drive motor 73 is provided at its rotary shaft with a frequency generator 74 which generates a frequency signal FG corresponding to the rotation speed of the capstan drive motor 73. The resulting frequency signal FG is supplied through an amplifier 75 to one input terminal N of the switching circuit 76. The frequency signal FG passed through the amplifier 75 is supplied through a frequency dividing circuit 77 to another input terminal V of the switching circuit 76.

The output from this switching circuit 76 is supplied to a servo circuit 78 from which a motor drive control voltage is derived. This motor drive control voltage is supplied through a motor drive circuit 79, an adding circuit 80, and an amplifier 81 to the capstan drive motor 73.

The switching circuit 76 is changed in position by a mode signal MD applied to a terminal 83.

To be more concrete, in the normal playback mode, this mode signal MD is, for example, "0" so that the movable contact of the switching circuit 76 is connected to the input terminal N, while a switching circuit 84 which will be described later is turned off. Accordingly, in this normal playback mode, the frequency signal FG is supplied as is to the servo circuit 78. Thus, the capstan drive motor 73 is applied with the speed servo such that the frequency of the frequency signal FG becomes a predetermined frequency $f_0$, thus transporting the magnetic tape 2 at the normal playback speed.

Subsequently, in the high speed playback mode, the mode signal MD becomes "1" so that the switching circuit 76 connects its movable contact to the input terminal V. Furthermore, since this mode signal MD is supplied to a frequency-dividing ratio setting circuit 82, in this high speed playback mode, a frequency-dividing ratio of the frequency-dividing circuit 77 is set as 1/n by the setting circuit 82. Accordingly, at this time, the switching circuit 76 generates a signal which results from dividing the frequency signal FG by n. This signal is supplied to the servo circuit 78. Thus, the speed servo is applied to the capstan drive motor 73 in such a manner that the frequency of the frequency-divided signal becomes a predetermined frequency $f_0$. That is, the tape 2 is transported at the speed n times as high as that of the normal playback mode.

Furthermore, in this high speed playback mode, the switching circuit 84 is turned on by the mode signal MD. Then, a wobbling signal from a wobbling signal generator 85 is supplied to the adder 80 and thereby superimposed upon the motor drive voltage. By this wobbling signal, the tape 2 is not transported at constant speed so that the tracing locus of the rotary heads HA and HB on the tape 2 do not become rectilinear, or is wobbled in the direction intersecting the scanning direction.

Since the index signal is generally written in the index area during a time period of 3 to 10 seconds at the normal tape speed, if the tracing locus is wobbled as described above, an index signal more than a predetermined level can be detected from at least one index area of a plurality of tracks corresponding to 3 to 10 seconds. Accordingly, it is possible to avoid the head output from always becoming zero, unlike the prior art.

Figure 9:
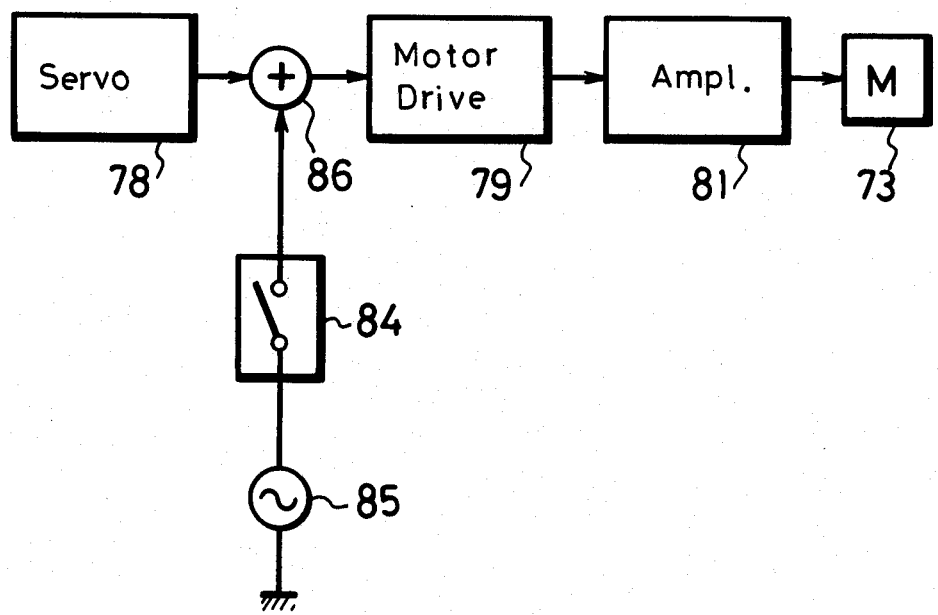
FIG. 9 is a block diagram showing another example of a main part of the present invention.
Figure 7A:
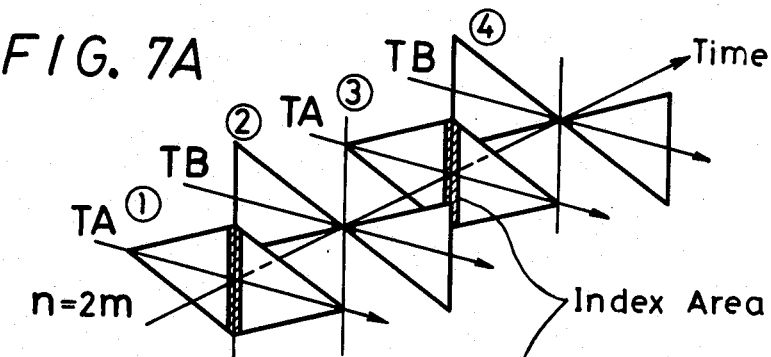
FIGS. 7A to 7D are diagrams respectively used to explain the outputs of the rotary heads in the high speed playback mode.
Figure 7B:
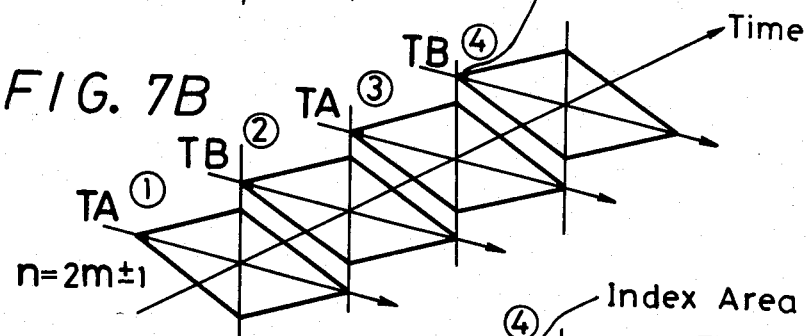
Figure 7C:
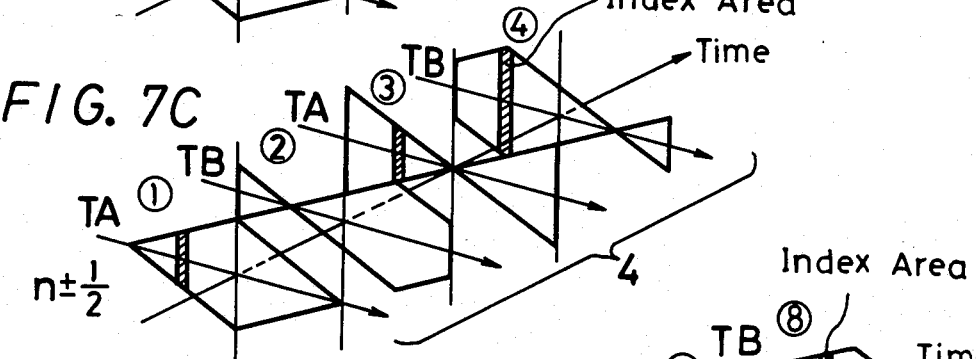
Figure 7D:
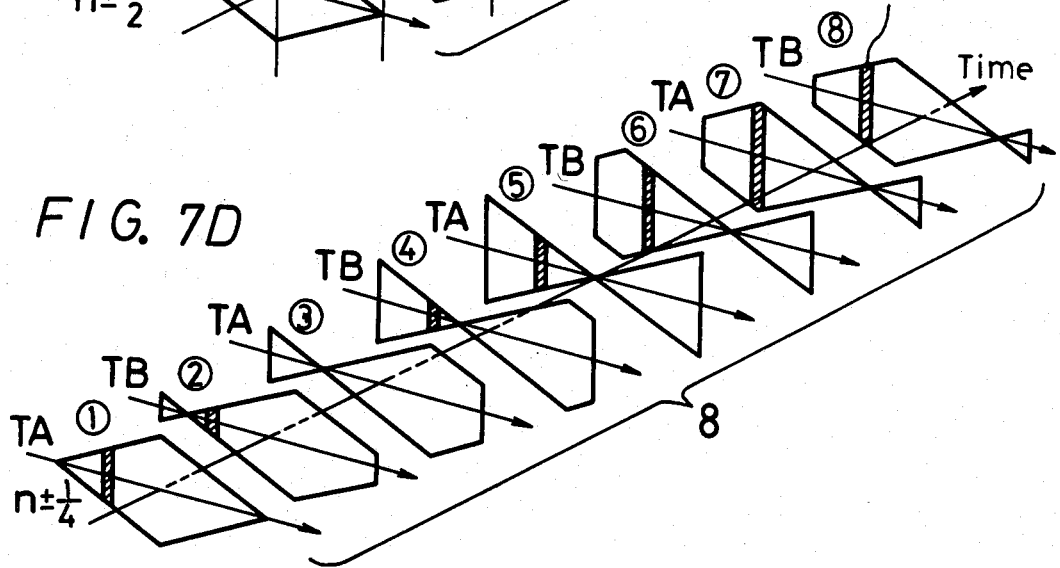

While in the embodiment shown in FIG. 8 the wobbling signal is superimposed upon the motor drive voltage, alternatively such a version may be possible that, as shown in FIG. 9, the wobbling signal is supplied through the switching circuit 84 to an adding circuit 86 in which it is added with the output voltage from the servo circuit 78 in the high speed playback mode. Furthermore, the wobbling signal may be a signal which has no correlation to the rotation period of the capstan drive motor 74.

In the high speed playback mode, it is alternatively possible that the wobbling is applied to the rotation of the capstan motor in the following manner.

FIG. 10 is a block diagram of one example of a reproducing system which is provided with another embodiment of this invention. In this embodiment shown in FIG. 10, like parts corresponding to those of FIG. 8 are marked with the same references and will not be described in detail.

In this embodiment, there is provided no special signal source for effecting the wobbling, unlike the first embodiment shown in FIG. 8. In this embodiment, in the high speed playback mode, the frequency-dividing ratio set by the frequency-dividing ratio setting circuit 82 is alternately changed to 1/N and 1/M at the period several times to several 10s of times of, for example, the vertical frequency. That is, of the frequency-dividing ratio is changed at, for example 6 vertical periods, at every three rotations of the rotary heads HA and HB, the frequency-dividing ratio is changed-over 1/N and 1/M (N≠M).

Accordingly, each time the rotary heads HA and HB are rotated three times, the tape 2 is alternately transported to the tape speed N times and M times as high as the normal tape speed with an effect similar to that of the first embodiment in FIG. 8 being achieved.

The period at which the frequency-dividing ratio is changed is determined according to the responsive speed of the capstan motor.

According to this embodiment, unlike the first embodiment shown in FIG. 8, the special signal source for the wobbling is not required. Also, the setting of the frequency-dividing ratio can be controlled by use of a micro-computer so that the manufacturing cost can be avoided from being increased, and the apparatus of the invention can be realized with ease from this standpoint.

In the above mentioned embodiments, the reason that in the high speed search mode the frequency signal FG is divided and the capstan drive motor is servo-controlled by the divided signal is to obtain a reproduced picture of the video signal in this high speed search mode. In the high speed search mode, to detect the index signal such a servo is not necessary. In other words, it is alternatively possible that a constant voltage is applied to the capstan drive motor and the capstan drive motor is allowed to run freely. The tape is transported at the high speed and the wobbling is applied to the rotation of the capstan drive motor.

When the servo is applied to the capstan drive motor as set forth above, the video signal is reproduced at high speed, while when the index signal is not detected, the switching circuit 84 is turned off. Only when the index signal is detected, the switching circuit 84 is turned on.

While in the above mentioned embodiments the capstan motor is controlled, needless to say this invention can also be applied to a case where a reel motor is controlled.

Furthermore, in this invention, it may be possible that the tape running speed is not controlled, but a rotary head is mounted, for example, on a bimorph leaf plate and a control voltage is applied to this bimorph leaf plate. Thus, in the high speed playback mode, each head can be wobbled in the direction perpendicular to its scanning direction at every predetermined period, or at random.

Furthermore, in the above mentioned embodiments, since the postamble signal is the signal having the frequency of 5.8 MHz which is the data "1", the signal having a frequency of 2.9 MHz which is the data "0" is used as the index signal. In this case, however, the index signal is not limited to the above mentioned signal, but a signal having a pattern which does not appear as the data can be used.

Furthermore, as the index signal, it is of course possible to record the coding data. If the coding is carried out as described above, it is possible to record as the index signal, in addition to data indicative of a starting point of a tune, data indicating the intermediate portion of the tune, and other data such as a tape speed, a time information and so on.

In addition, the present invention is not limited to the 8 mm VTR but can also be applied to an index signal detecting system used in a rotary head type reproducing apparatus.

According to the present invention as set forth above, in the high speed search mode, the rotary head does not draw a tracing locus definitely determined relative to the recording track pattern, but is wobbled in the direction perpendicular to the scanning direction so that the head output can be prevented from always becoming zero in the recording area portion of the index signal. Thus, it becomes possible to make the detection probability of the index signal uniform.

Although various minor changes and modifications might be proposed by those skilled in the art, it will be understood that we wish to include within the claims of the patent warranted hereon all such changes and modifications as reasonably come within our contribution to the art.

We claim as our invention:

1. An index signal detecting system applied to a helical scan type recording apparatus for detecting program search index information recorded on slant tracks of a recording tape, comprising:
   (a) a rotary transducing means having a scanning head;
   (b) tape driving means for advancing the recording tape in transducing relation to said rotary transducing means at both a normal recording speed where the scanning head scans along a slant track and a relatively higher speed playback search mode where the scanning head transversely crosses a plurality of the slant tracks;
   (c) wobbling means for wobbling during the higher speed playback search mode relative positions of said rotary transducing means and recorded tracks formed on said recording tape in a direction transverse to a scanning direction of the scanning head so as to avoid missing the program search index information; and
   (d) an index detecting means connected to said rotary transducing means for deriving the program search index information out of reproduced signals obtained from said rotary transducing means during the higher speed playback search mode.

2. An index signal detecting system according to claim 1 wherein said tape driving means includes a capstan and a pinch roller, and said wobbling means includes means for effecting a speed change of said capstan.

3. An index signal detecting system according to claim 2 wherein a capstan driving means drives said recording tape at higher speed than normal recording speed during the detection of said index information.

4. An index signal detecting system according to claim 3 wherein said recorded tracks include digital data, and said index information is derived from reproduced digital data from said rotary transducing means at said index detecting means.

5. An index signal detecting system according to claim 4 wherein said wobbling means includes a wobbling signal generator means for supplying a wobbling signal to said capstan driving means.

6. An index signal detecting system for use in a helical scan type recording apparatus for detecting program search index information recorded on slant tracks of a recording tape, comprising:
   a helical scan rotary transducing means having a scanning head;
   tape driving means for advancing the recording tape to be helically scanned in transducing relation to said rotary transducing means;
   means connected to said tape driving means for driving the recording tape at higher speed than normal recording speed during a search mode when detection of the program search index information on said recording tape is desired, the scanning head transversely crossing a plurality of the slant tracks on each scan during the higher speed search mode;
   wobbling means connected to the means for driving for wobbling said higher speed when searching for the index information during the search mode so as to avoid missing the program search index information; and
   index detecting means connected to said rotary transducing means for deriving said program search index information out of reproduced signals obtained from said rotary transducing means during the higher speed search mode.

7. A system according to claim 6 wherein said wobbling means causes a periodic relative position change between said scanning head and slant tracks in a direction transverse to a scanning direction of the scanning head.

* * * * *